Nov. 13, 1928.

V. F. GREAVES 1,691,569

INDICATOR

Filed Jan. 23, 1922    3 Sheets-Sheet 1

WITNESS
A. E. Alberg.

INVENTORS
VALENTINE FORD GREAVES
BY
White Prost Evans
ATTORNEYS

Nov. 13, 1928.　　　　V. F. GREAVES　　　　1,691,569
INDICATOR
Filed Jan. 23, 1922　　　3 Sheets-Sheet 2

WITNESS

INVENTORS
VALENTINE FORD GREAVES
BY
ATTORNEYS

Nov. 13, 1928.  
V. F. GREAVES  
1,691,569  
INDICATOR  
Filed Jan. 23, 1922    3 Sheets-Sheet 3

WITNESS  
A. E. Alberg

INVENTORS  
VALENTINE FORD GREAVES  
BY  
White, Prost & Evans  
ATTORNEYS

Patented Nov. 13, 1928.

1,691,569

UNITED STATES PATENT OFFICE.

VALENTINE FORD GREAVES, OF BURLINGAME, CALIFORNIA, ASSIGNOR, BY MESNE ASSIGNMENTS, TO FEDERAL TELEGRAPH COMPANY, OF SAN FRANCISCO, CALIFORNIA, A CORPORATION OF CALIFORNIA.

INDICATOR.

Application filed January 23, 1922. Serial No. 531,079.

This invention relates to an indicator, and more particularly, to indicators such as direction finders, requiring a correction to be applied to the reading of the indicator.

One example where such corrections are necessary is an ordinary ship's compass. It is well known that to the readings of such a compass about five different corrections must be applied. One of the errors which necessitate these corrections is that due to the magnetic effect of the mass of the ship itself upon the compass needle. This effect is variable with the relative angular position of the needle and the ship; i. e. if for example the needle is pointing in the same direction as the ship, a different correction must be made than if the needle is pointing in some other direction, and in general for each angle of deviation between the direction of the ship and that of the needle, different corrections must be applied. It is found that this particular error changes sign for every 90° of variations between the direction of the ship and the direction of the needle.

Another example where corrections of this sort must be applied is in the radio compass used on board ship or elsewhere, invented by Frederick A. Kolster, upon which an application has been filed, November 22, 1920, Serial No. 425,834. In this case the compass is used to determine the bearing of a source of radiant energy. As explained in the application here identified, the waves received from the source are distorted by the metallic mass of the vessel, and this distortion is a function of the angle between the axis of the ship and the bearing of the source. It is found that in this case also, the errors change sign for every 90° of variation between the direction of the ship and the bearing of the source of energy. The invention is particularly well adapted for radio compasses due to the fact that the pointing of the compass is effected by an external force of any required magnitude, which force may be also utilized to perform the correction.

When corrections of the character described must be applied to the instantaneous readings of an indicator by actual addition or subtraction, the liability that the wrong correction will be applied is large, since there might be an error in reading the sign of the correction as well as in adding or subtracting. Furthermore, there is a loss of time in applying the corrections, the observations of the errors after the indicator is installed must be converted to terms of the scale, and after the scale of corrections is once installed it is difficult to change the scale in case variations in the characteristics of the ship require such a change.

One object of my invention is to apply the correction automatically to the position of the indicator and thus to obviate all necessity for observing errors and for applying corrections. Another object is to make it possible to vary the amount of correction applied to the indicator simply and quickly. Another object is to produce a radio compass that is reliable under all conditions of service. Still another object is to provide a novel mechanical movement.

The invention possesses other advantageous features, some of which, with the foregoing, will be set forth at length in the following description, where I shall outline in full that form of the invention which I have selected for illustration in the drawings accompanying and forming part of the present specification. In the drawings, I have shown but one form of my invention, but it is to be understood that I do not limit myself to that form, since the invention as expressed in the claims may be embodied in other forms as well.

Referring to the drawings.

I have shown my invention as applied to a radio compass which comprises, as an essential element, a coil rotatable as by hand or any other external force, a pointer such as sighting hairs so connected to the coil that the position of the pointer is determined by the position of the coil, and a compass card with which the pointer cooperates.

Figure 1:
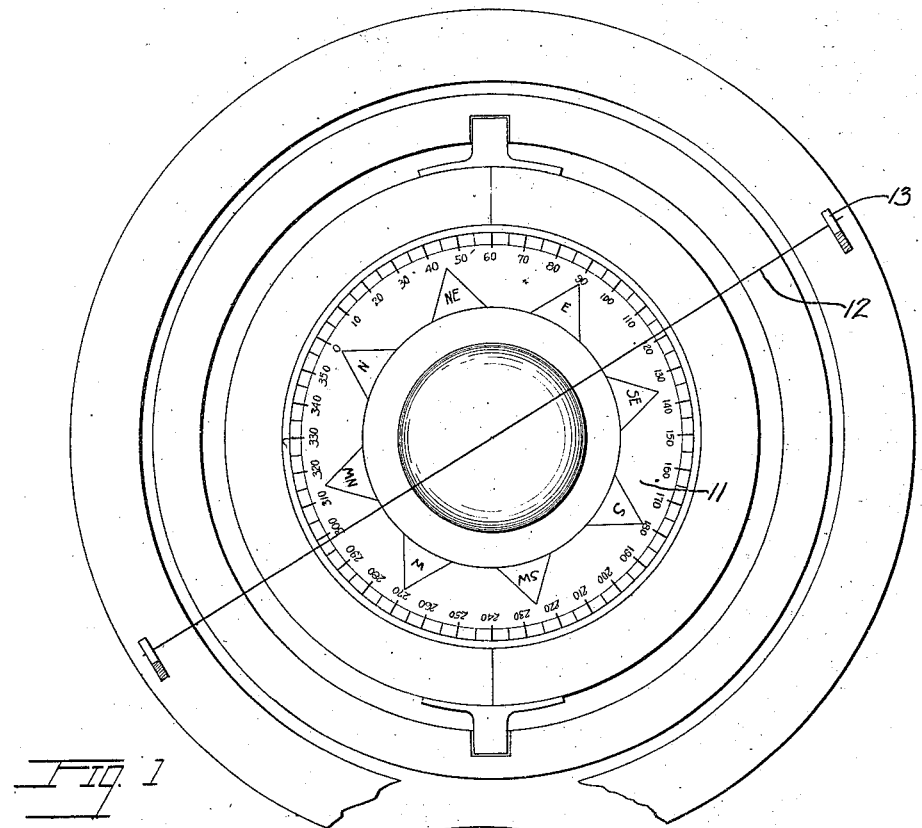
Figure 1 is a top plan view of a compass card and scale as applied to a radio compass such as described in the application hereinbefore identified.

Fig. 1 shows the compass card 11 and the sighting hairs 12, and since these elements resemble to a large extent the usual arrangement in devices of this character, it is not considered necessary to describe them in greater detail. It is also evident that other equivalent forms of pointers and cards may be used.

The sighting hairs 12 are appropriately supported in a fork 13 which is rigidly fastened to a rotatable shaft 14. Motion to this shaft is transmitted through an intervening compensating or correcting device 15, from the movement of a hand wheel 16 which is securely fastened to the hollow shaft 17. This shaft is adapted to support a coil 10, which is to be pointed at the source of radiations, by means of a pipe 21 fastened to the wheel 16 in any appropriate manner. Although in the present instance manual means comprising the hand wheel 16 is shown for rotating the coil 10, it is of course obvious that other means may be substituted for performing this function. The shaft 17 also carries a member 18 inserted into the end of the shaft and appropriately fastened thereto as by the pin 19 passing through both parts 17 and 18. This member 18 serves as an anchor for one end of a helical coil spring 20 which is located within the hollow shaft 17. The pipe 21 may pass through the roof of the pilot house as described in the application hereinbefore identified.

The shaft 17 is further supported in the stationary bearing member 22, which is shown as made integral with a hood or cover 23. This cover encloses the working parts of the compensator 15, and is fastened to a stationary support 24 as by the screws 25.

This stationary support is cast integral with three legs or standards, as well as with the bearing member 26 within which the shaft 14 is journaled. The three legs are conveniently united by an integrally formed flange 27 which is adapted to be secured, as by screws, to a standard supporting the compass card 11. The lower extremity of the coil spring 20 is anchored to the shaft 14. This spring is constantly under tension, and so arranged that if it were free to act, a considerable relative movement between the two shafts 17 and 14 would result. However, the compensating or correcting device 15 controls the extent which the shaft 14 is free to follow the movement of shaft 17 in response to the torque imposed upon it by the spring 20. The spring 20 is shown in the present instance arranged so that it constantly tends to rotate shaft 14 in a counter-clockwise or negative direction. Then, if a counter-clockwise or negative correction must be applied, the compensating device 15 permits the shaft 14 to be urged by the spring in a counter-clockwise direction, while if a clockwise or positive correction must be applied, the compensating device acts to assist the winding up of the shaft. The compensating device 15 thus determines a unique angular position for shaft 14 for each position of shaft 17 relative to the axis of the ship. One embodiment of the compensating device 15 will now be described in greater detail.

Figure 2:
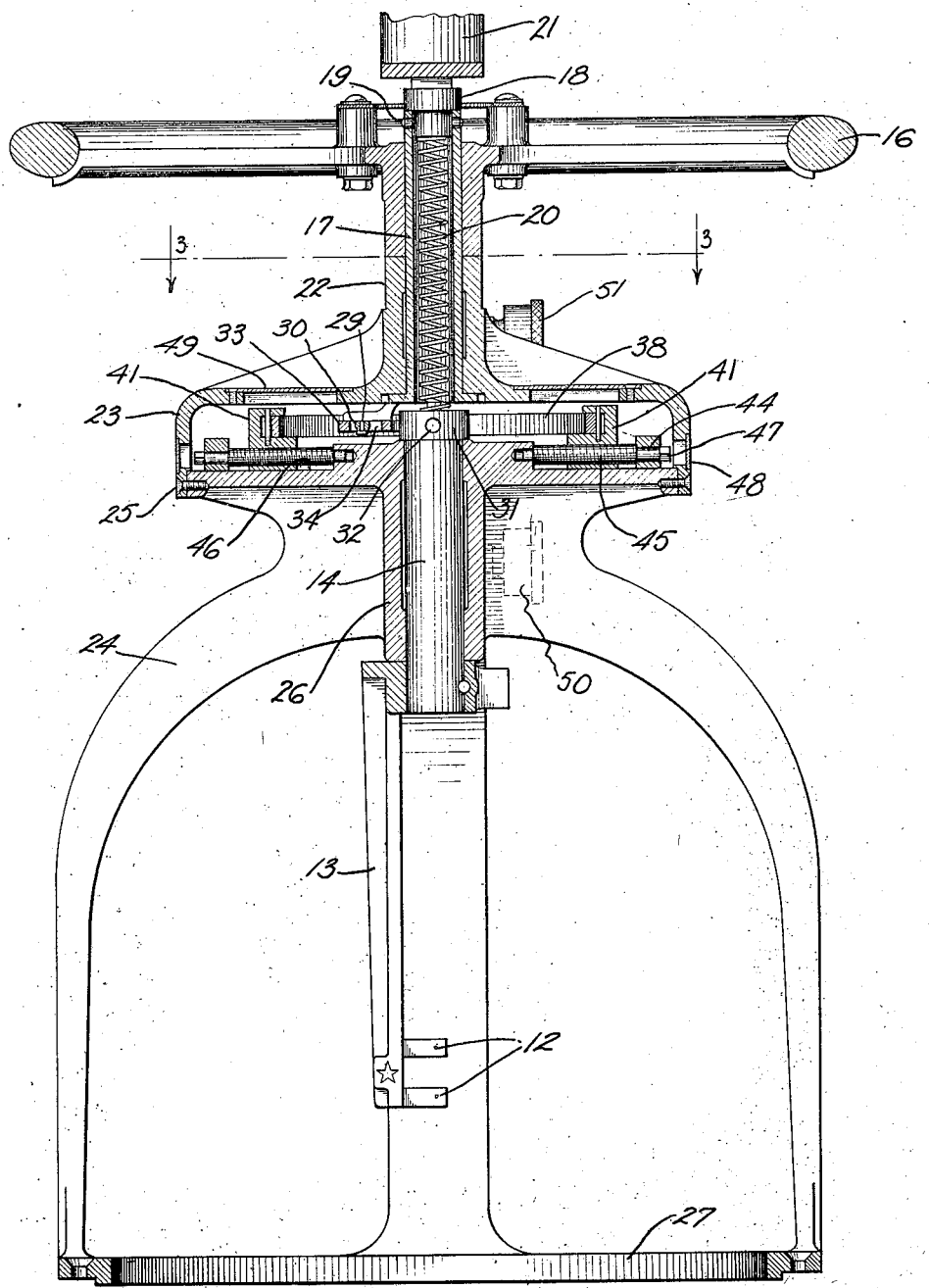
Fig. 2 is a longitudinal sectional view of that portion of a radio compass embodying our invention.

The shaft 17 carries, at its lower extremity, a crank arm 28 preferably formed integral with this shaft. This crank arm supports a pin 29 having an axis parallel to the axis of shaft 17. Upon this pin is journaled a roller 30, as clearly shown in Fig. 2. That portion of shaft 14 which is closest to the shaft 17 has an enlarged portion 31 the better to support a rod 32, which is fastened rigidly to it, and which has an axis non-parallel to the axis of shaft 14. In the present instance, the axis of rod 32 and that of shaft 14 are shown as intersecting at right angles to each other. Upon this rod 32 is placed a fork 33, so arranged that it may slide thereon. Thus, the rod 32 serves as a guide for the movement of member 33. This member 33 has a slot 34 with which the roller 30 coacts, and the contact between the roller and slot serves as one point of connection between the mechanisms associated with the two shafts 14 and 17. The axis of the slot 34 is radial to the axis of these shafts, so as to permit relative movement between the roller and the slot.

Figure 3:
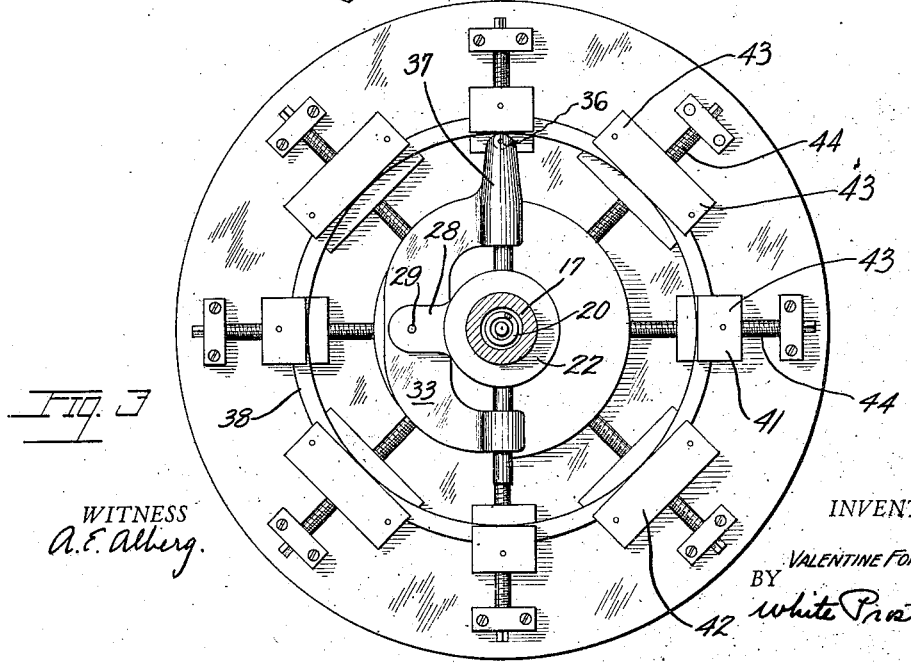
Fig. 3 is a cross sectional view along line 3—3 of Fig. 2, with the cover removed from the working parts.
Figure 4:
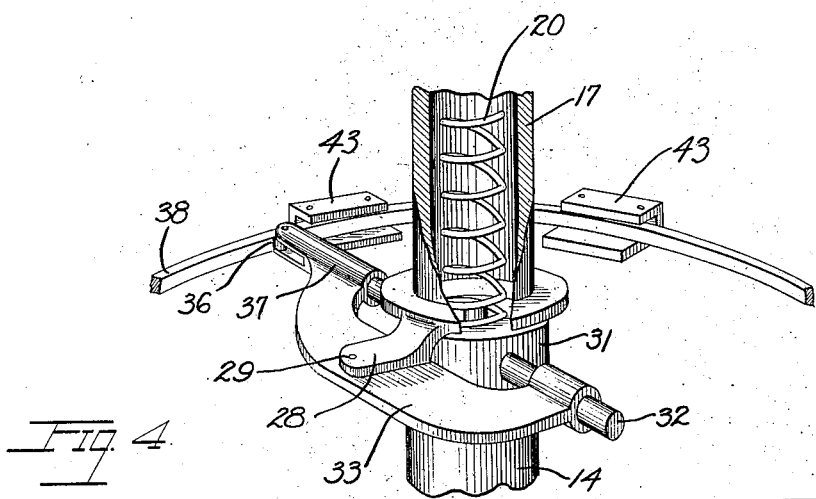
Fig. 4 is a perspective view showing more clearly how the correction is automatically applied to the indicator shaft.
Figure 5:
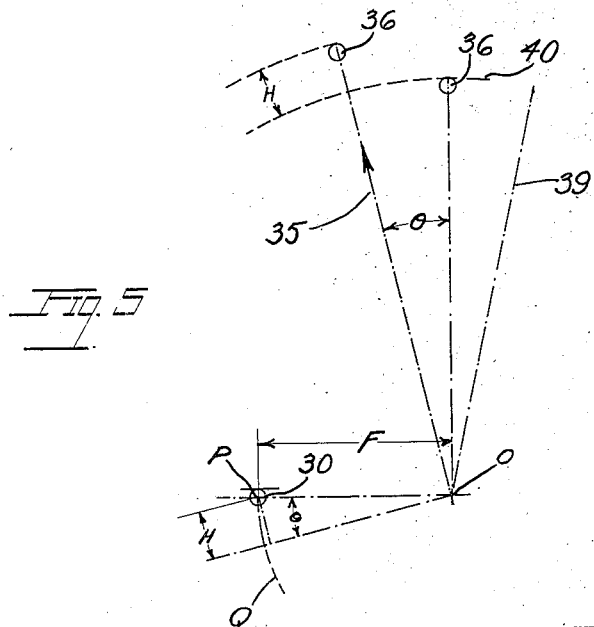
Fig. 5 is an explanatory diagram of the action of the levers employed in that embodiment of our invention which is described herein.
Figure 6:
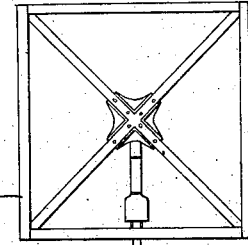
Fig. 6 is a general view of a complete radio compass and coil.
Figure 6:
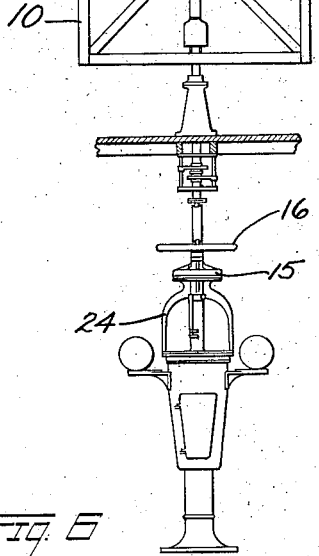

By referring to Fig. 5, the movements of the elements thus far described may be made plain. The position of the axes of the shafts 14 and 17 is represented by the point O; the position of the axis of roller 30 is represented by point P. The position of this point is determined by the position of the coil, and in the following discussion it will be considered as fixed. The spring 20 has such tension upon it that it tends to rotate the shaft 14 in a counter-clockwise or negative direction, relative to shaft 17. If no restraint were placed upon the movement of the yoke or fork 33, it would simply rotate with the shaft 14, and any point in the slot would describe a circle, as Q. The roller 30, which is fixed and contacts with the slot, prevents this movement; thus, after shaft 14 rotates through an angle $\theta$ from the position of Fig. 3 or Fig. 4, the amount which the point was restrained in a direction parallel to the axis 35 of the rod 32 is represented by the dimension H. This amount is taken up by the sliding movement of the fork 33 in the direction of the arrow on line 35. This rotation of the shaft 14 relative to shaft 17 is of course limited either by the amount which the fork 33 can slide upon the guide 32, or by the length of the slot 34. However, simple controllable means are provided for determining the relative rotation, which may thus determine the amount of correction that is to be applied to the position of shaft 17.

This control means comprises a roller 36 or other contacting element, carried by that arm 37 of the fork 33 which tends to slide outwardly under the action of the spring 20, as described heretofore. This roller 36 cooperates with a cam 38, which serves as an abutment for the roller, and thus limits the amount which the fork 33 can slide upon the guide 32. It is evident that by properly forming the cam surface, it is possible to obtain any required correction, either positive or negative. Thus, if the cam surface be truly circular, there would be no relative rotation between the two shafts. Fig. 5 represents a condition in which a correction is applied in a counter-clockwise or negative direction, corresponding to the angle θ. This correction, if F is the length of the crank arm 28, may be expressed as:

$$\sin \theta = \frac{H}{F}$$

From this formula it is possible to obtain H if θ is given. This value represents the distance outward in a radial direction from the true zero-correction circle 40 of the cam surface corresponding to the position of line 35. For correction in the positive direction, as for example to line 39, it is necessary that the roller 36 have a position within the zero correction circle 40, and this may be effected by having the cam surface extend inward from the circle 40 by the proper amount.

In the case at present considered, where the corrections are required for the deflection or distortion of the electromagnetic wave front by the mass of a ship, the cam 38 is most conveniently made of a brass ring, held on the supports 41 and 42. These supports are provided with means for deforming the brass ring or cam 38, so that it may take a form somewhat like an ellipse. The necessary deformation is usually slight and may easily be effected. For performing the deformation, the supports 41, shown as four in number, are provided each with one pin 43, and the supports 42, symmetrically placed with respect to the supports 41, are provided each with two pins 43. These pins contact with the outer surface of the ring or cam 38, and the supports 41 and 42 are so arranged that they may be moved radially of the ring 38, as by means of screw shafts 44 having bearings in the support 24, which is stationary as regards the ship. The threaded portion 45 of these shafts engage with taps through the supports 41 and 42. These supports are prevented from rotating by being provided with a flat surface sliding on the surface 46 provided on the stationary member 24. The screw shafts 44 are provided with squared portions 47 extending beyond the outer bearing, so that they may be readily turned. Apertures 48 may also be provided in the cover of hood 23, opposite these squared portions, so as to render it unnecessary to remove the hood for adjusting the cam. This cover may also be conveniently provided with larger apertures 49 on its upper surface which may be normally kept closed. Lubrication is provided for shafts 14 and 17 by means of the grease cups 50 and 51.

It is found that the points of the cam 38 which are engaged by the pins 43 in the four supports 41 may represent points of zero correction; i. e. nodal points. By turning the screw shafts 44 of the other supports 42 inwardly to deform the ring 38, the proper form may be easily imparted to the cam. The position of the cam relative to the ship being fixed, for every relative position of the axis of the coil and of the axis of the ship, a definite correction may be imparted to the shaft carrying the sighting hairs. A great advantage of this device resides also in the ease with which the cam may be adjusted if the wave-front-distorting or other characteristic of the ship happens to vary.

I claim:

1. In a radio compass for ships or the like, means adapted to be rotated to point to a source of radiant energy, a rotatable member coaxially arranged with the first mentioned means, a tensioned member secured at opposite ends to said rotatable members respectively and tending to cause relative rotation thereof, and means controlling the amount of relative rotation operated in accordance with the position of one of the shafts relative to the ship.

2. Radio apparatus comprising a pair of rotatable shafts, radio direction-determining and indicating members connected respectively to said shafts, means tending to cause relative rotation of the two shafts, a member movable in a radial direction so arranged that a variation in its position is produced by relative rotation of the shafts, and means representative of wave distortion for controlling the extent of the radial movement.

3. Radio apparatus comprising a pair of rotatable elements, radio direction-determining and indicating members connected respectively to said elements, a tensioned member connecting and tending to cause relative rotation of the two elements, a movable member the position of which is varied upon relative rotation of the two elements, and a cam representative of wave distortion controlling the extent of movement of this member.

4. In an indicator, a pair of rotatable, coaxially mounted shafts, means tending to cause relative rotation of the shafts, a guide radial to the axis of the shafts and carried by one of them, a member slidable along the guide, means carried by the other shaft tending to slide this member upon relative rotation between the shafts, and a stationary cam limiting the extent to which the member may be slid.

5. Radio apparatus comprising a pair of rotatable, coaxially mounted shafts, radio direction-determining and indicating members connected respectively to said shafts, means tending to cause relative rotation of the shafts, a cam having an internal cam surface representative of wave distortion surrounding the shafts, and a member movable radially of the axis of the shafts upon relative movement thereof, the cam limiting this radial movement, whereby the extent of the relative movement is determined for each position of one of the shafts with respect to the cam.

6. In an indicator, a pair of rotatable, coaxially mounted shafts, one of the shafts being hollow, a coil spring within this shaft so arranged as to tend to cause relative rotation between the shafts, a crank arm carried by one of the shafts, a rod carried by the other shaft arranged with its axis radial to that of the two shafts, a member slidable along the rod and connected with the crank arm in such a way that relative rotation of the two shafts cause a radial movement of the member, and a cam having an internal cam surface surrounding the shafts, serving to limit the extent of movement of the slidable member.

7. A mechanical movement comprising a pair of coaxially mounted shafts, an arm carried by one of said shafts, a guide carried by the other, a member slidable along the guide by the arm upon relative rotation of the two shafts, and a stationary cam controlling the extent of radial movement of this member.

8. A mechanical movement comprising a pair of coaxially mounted shafts, one of said shafts being hollow, a coil spring within this shaft and coaxial therewith, said spring being arranged so as to tend to produce relative rotation of the shafts, an arm carried by one of the shafts, a radial guide carried by the other shaft, a member slidable along the guide, and mechanically connected to the arm carried by one of the shafts whereby upon relative movement of the shafts, the member is slid along the guide, and means for limiting the extent of movement of this member.

9. In a radio compass, a pair of rotatable axially aligned shafts, a coil spring coaxial with and secured at its respective ends to said shafts tending to effect relative rotation thereof, a member movable in a radial direction so arranged that a variation of its position is produced by relative rotation of said shafts, and means for controlling the extent of the radial movement.

10. In a radio compass, a housing, coaxially mounted shafts extending exteriorly of said housing, means tending to cause relative rotation of said shafts, a coil movable by one of said shafts, an indicating member movable by another of said shafts, and means within said housing controlling the extent of relative rotation of said shafts.

11. In a radio compass, a housing, a pair of co-axially mounted shafts accessible exteriorly of said housing from opposite sides thereof, means tending to cause relative rotation of said shafts, a coil mounted for rotation by one of said shafts, an indicating member secured to the other of said shafts, and means contained within said housing to limit the extent of relative rotation of said shafts.

12. In a radio compass, a housing, a pair of shafts rotatably mounted in said housing, means within said housing tending to cause relative rotation of said shafts, a coil mounted for rotation upon movement of one of said shafts, an indicator secured to the other of said shafts, and means within said housing to determine the extent of relative rotation of said shafts.

13. In a radio compass, a housing, a pair of rotatable shafts extending exteriorly of said housing, means tending to cause relative rotation of said shafts, a member within said housing and movable in a radial direction so arranged that variation of its position is produced by relative rotation of said shafts, and means within said housing controlling the extent of radial movement.

14. In a radio compass, a pair of co-axially mounted shafts, an arm carried by one of said shafts, oppositely extending guide members carried by the other of said shafts, a member embracing said other of said shafts and slidable along said guide members upon relative rotation of said shafts, and a stationary cam determining the extent of movement of said member.

15. The combination with a compass card, of a rotatable coil, an indicating member coacting with said card, a housing spaced from said card, a pair of shafts rotatably mounted in said housing and connected to said coil and indicating member respectively, and means within said housing for varying the position of said indicator with respect to said coil to compensate for departure of apparent from true direction of propagation of electro-radiant energy.

16. In a radio compass, a housing comprising two separate members, a pair of shafts journaled for rotation in corresponding housing members, a coil effecting direct interchange of electro-radiant energy between itself and a natural medium mounted for rotation with one of said shafts, an indicator rotatable by the other of said shafts, means tending to cause relative movement of said shafts, and means within said housing to control said relative movement to compensate for wave front distortion.

17. In a radio compass, a compass card, a housing, a shaft, an indicator secured to said shafts and interposed between said housing and said card, a second shaft within said housing, a rotatable coil mounted for movement with said second shaft, means tending to cause relative movement of said shafts, and means within said housing for causing the movement of said indicator to be equal to or to differ by a proper amount from that of said coil.

In testimony whereof, I have hereunto set my hand.

VALENTINE FORD GREAVES.